Figure 1:
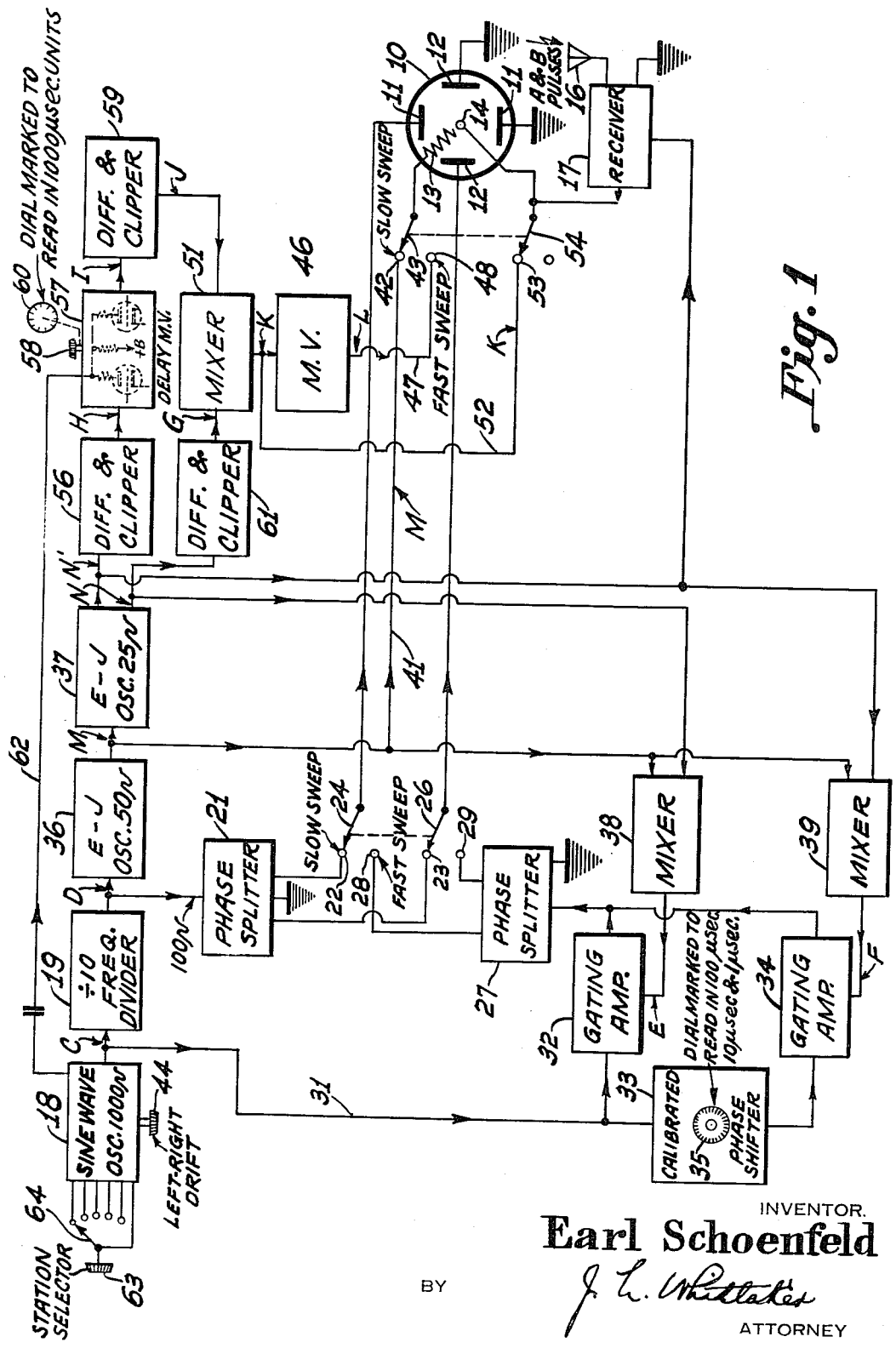

July 19, 1955  E. H. SCHOENFELD  2,713,682
RADIO NAVIGATION SYSTEM OF LORAN TYPE
Filed Nov. 29, 1947  3 Sheets-Sheet 2

INVENTOR.
Earl Schoenfeld
BY
ATTORNEY

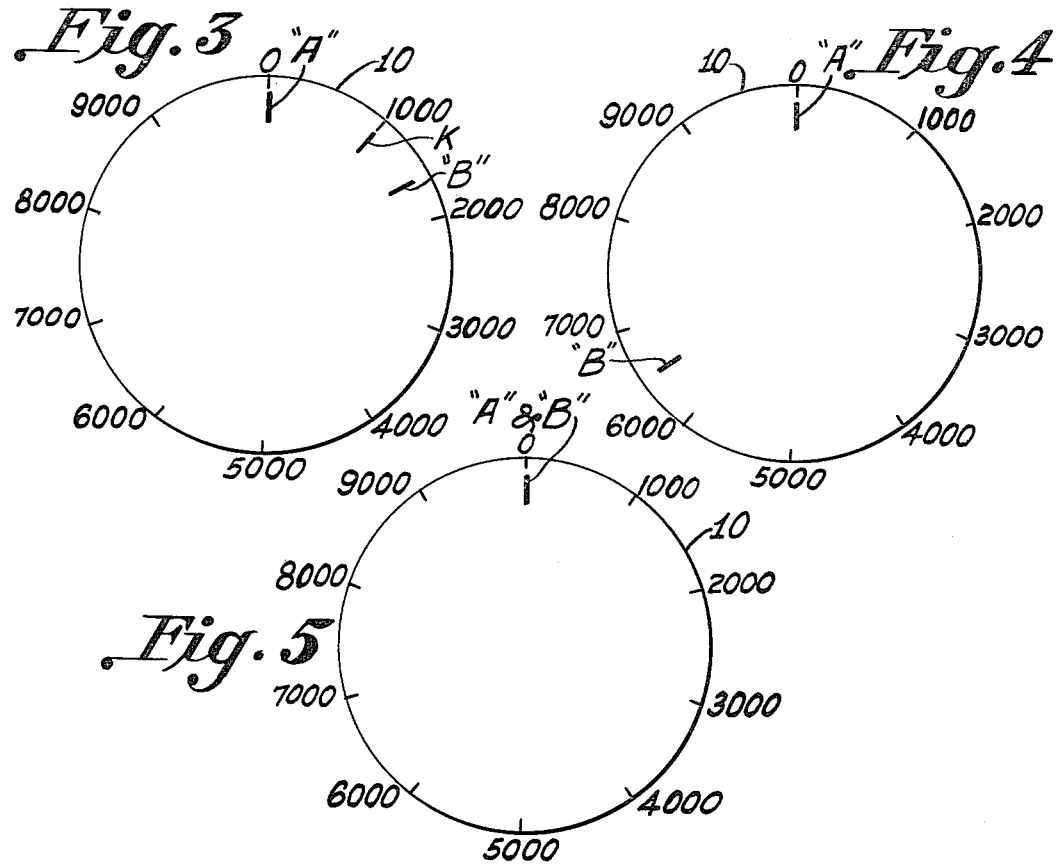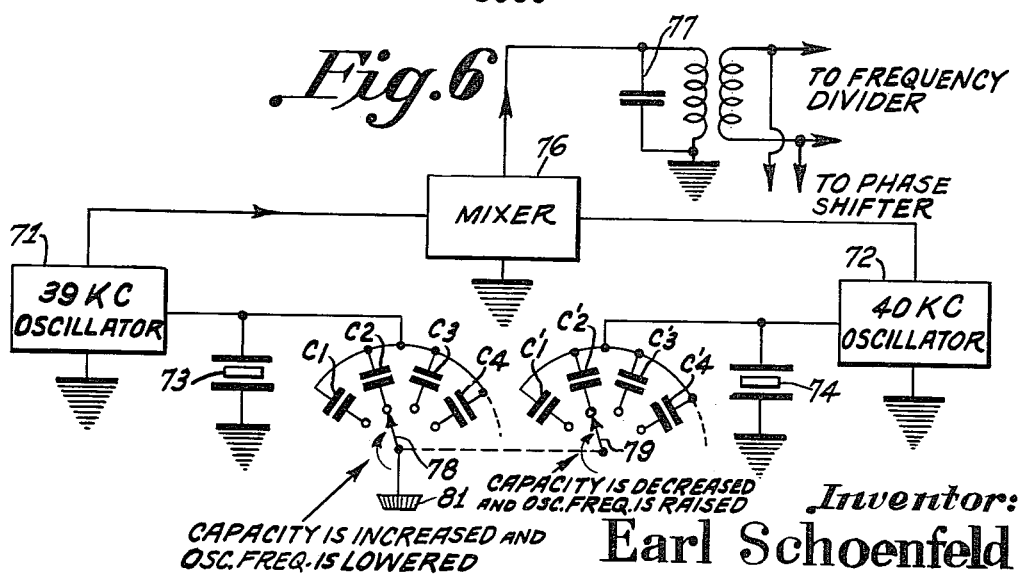

United States Patent Office 2,713,682
Patented July 19, 1955

2,713,682
RADIO NAVIGATION SYSTEM OF LORAN TYPE

Earl H. Schoenfeld, Mamaroneck, N. Y., assignor, by mesne assignments, to the United States of America as represented by the Secretary of the Army Application November 29, 1947, Serial No. 788,921

12 Claims. (Cl. 343—103)

My invention relates to radio navigation or position determining systems and particularly to systems of the loran type.

In loran systems radio pulses are transmitted in synchronism from two geographically spaced points and these pulses are received at the airplane or other mobile unit the position of which is to be determined. The receiving apparatus determines the time interval between successive pulses received from the two points, thus establishing that the airplane is on a certain hyperbolic line. Similarly, by means of a second pair of transmitting stations it may be established that the airplane is on a second hyperbolic line. The position of the airplane is given by the point of intersection of the two lines. It will be understood that loran systems are used with maps that have hyperbolic lines drawn thereon that correspond to different time intervals, there being one set of lines for each pair of ground stations.

An object of the present invention is to provide simplified receiving equipment for a navigation system of the loran type.

A further object of the invention is to provide an improved navigation system of the loran type wherein the time interval readings may be read off dials or pointers rather than off the screen of a cathode ray tube.

A still further object of the invention is to provide improved and simplified apparatus for determining the time interval between successive electrical pulses.

According to a preferred embodiment of the invention the received pulses A and B from a pair of A and B ground stations, respectively, are made to appear on the screen of a cathode ray tube first on a slow sweep timing axis for a coarse time interval reading, and next on a fast sweep timing axis for the exact time interval reading. The timing axis deflection is circular in the example described but it may be a linear deflection if desired.

According to one feature of the invention alternate timing sweep traces of the cathode ray are blanked out when the apparatus is set for the slow sweep operation. This enables the operator to distinguish between the A and B pulses. A reading in 1000 microsecond units is taken while the apparatus is operating on the slow sweep.

The apparatus is next switched for the fast sweep operation and a calibrated phase shifter is adjusted to bring the A and B pulses into coincidence. Then the final reading is taken off the dial of the phase shifter. This reading is in 100 microsecond units, 10 microsecond units and 1 microsecond unit and it is added to the previous reading obtained in 1000 microsecond units.

Figure 2:
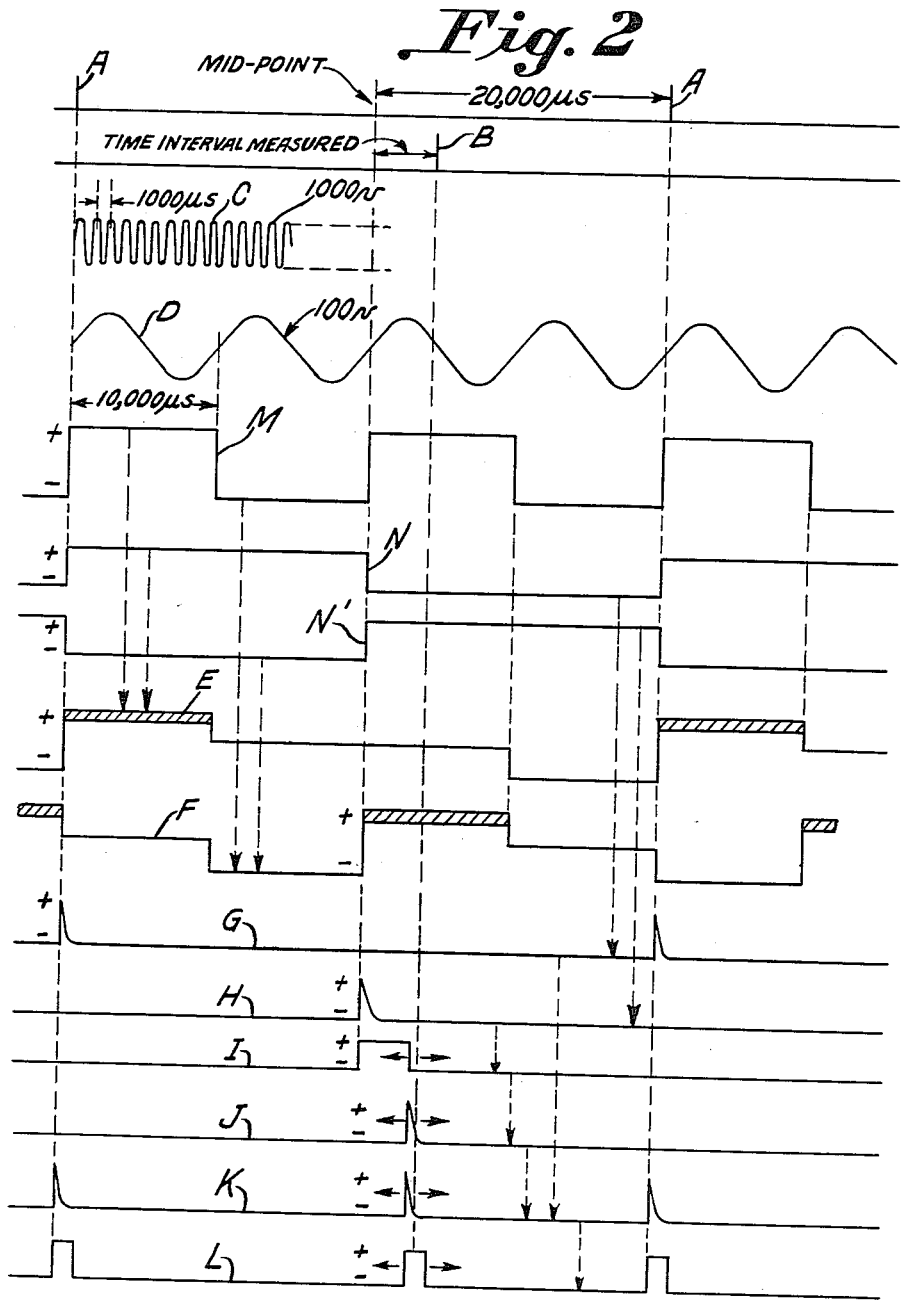

The invention will be better understood from the following description taken in connection with the accompanying drawing in which:

Figure 1 is a block diagram of one embodiment of the invention,

Figure 2 is a group of graphs that are referred to in explaining the operation of the apparatus shown in Fig. 1, Figures 3, 4 and 5 are views of the screen of the cathode ray tube employed in the system of Fig. 1 showing, by way of example, the appearance of the A and B pulse indications for different operating steps, and Figure 6 is a block and circuit diagram of an oscillator unit that may be employed in the apparatus of Fig. 1.

In the several figures similar parts and graphs are indicated by similar reference characters.

Referring to Fig. 1, the apparatus for measuring the time interval between the A and B pulses comprises a cathode ray indicator tube 10 which is of well known construction. The tube 10 comprises a pair of deflecting plates 11 and a pair of deflecting plates 12 positioned at right angles thereto. It also comprises a control electrode 13 and a radial deflecting electrode 14.

The received A and B pulses from the pair of ground stations are picked up by an antenna 16 and supplied to a radio receiver 17 where they are demodulated and amplified. They are then supplied to the radial deflecting electrode 14. In the example of the invention being described the A and B pulses each have a repetition period of substantially 40,000 microseconds. The precise value depends upon what pair of ground stations is being received.

The slow sweep circular deflection is obtained as follows:

A sine wave oscillator 18 operating at a selected frequency close to 1000 cycles per second supplies signal C to a 10 to 1 frequency divider 19. Some of the resulting 100 cycle sine wave D is supplied to a phase splitter 21 to obtain two sine wave voltages having a 90 degree phase relation. These voltages are supplied by way of switch contact points 22 and 23 and switch arms 24 and 26 to the ungrounded deflecting plates 11 and 12 when the apparatus is in the slow sweep operating condition. It should be noted that the 100 cycle wave has a decimal relation to the high frequency wave and also that its repetition rate is substantially four times that of the A or B pulses.

The fast sweep deflection is provided by means of quadrature voltages from a phase splitter 27 that are applied to switch contact points 28 and 29. These quadrature voltages have a frequency of 1000 cycles per second and are obtained during one interval by supplying signal from generator 18 over a lead 31 and through a gating amplifier 32 to the phase splitter 27. They are obtained during another interval by signal that is supplied from the lead 31 through a calibrated phase shifter 33 having a dial 35 and through a gating amplier 34 to the phase splitter 27. The phase shifter 33 preferably is of the goniometer type. The two intervals referred to are indicated in Fig. 2 by the shaded portions of the waves E and F.

The waves E and F are obtained as follows:

Referring to Figs. 1 and 2, signal D of 100 cycles is supplied from the divider 19 to a rectangular wave generator 36, which may be of the Eccles-Jordan type, for producing a rectangular wave M of 50 cycle repetition rate. The wave M is supplied to another E-J oscillator 37 to produce rectangular waves N and N' which are of opposite polarity and of 25 cycle repetition rate.

The waves M and N are combined in a mixing circuit 38 to produce the wave E which is applied to the gating amplifier 32. The gating amplifier 32 passes signal only during the periods that wave E is of maximum amplitude. These periods occur during the occurrence or reception of the A pulses.

The waves M and N' are combined in a mixing circuit 39 to produce the wave F which is applied to the gating amplifier 34. The amplifier 34 passes signal only during the periods that the wave F is of maximum amplitude. These periods occur during the occurrence or reception of the B pulses.

The blanking of alternate timing sweeps during the slow sweep operation is obtained by applying the 50 cycle rectangular wave M over a lead 41 and through a switch contact point 42 and a switch arm 43 to the control grid 13 of the cathode ray tube. From an inspection of Fig. 2 it will be seen that a positive half cycle of the wave M occurs during the occurrence of the pulse A and that the next positive half cycle of wave M occurs during the occurrence of the pulse B.

Since the apparatus is to be used in a loran system where the B pulse will have a delay of from approximately 1000 microseconds to approximately 6000 microseconds, for example, as measured from the mid-point of the A pulse repetition period, it is apparent that in operation the B pulse always occurs during the second positive half cycle of wave M as shown in Fig. 2. Thus it is evident from inspection of Fig. 2 that if the B pulse is made to appear at the zero point of the cathode ray sweep where the A pulse should appear (which means that the B pulse has been made to occur at the start of a positive half cycle of wave M), then the A pulse will not be visible on the cathode ray tube screen because it will have been shifted into the region of the negative half cycle of wave M where the timing sweep is blanked out.

From the foregoing paragraph it will be understood that the A pulse is identified as the one at the zero point on the timing trace if the other pulse is visible on the screen. If with a received pulse appearing at the zero point there is no other received pulse visible, then it is known that the B pulse rather than the A pulse has been set at zero and it must be drifted around the timing trace until the A pulse appears. The A and B pulses may be drifted to desired positions by means of a drift control knob 44 on the oscillator 18 by means of which the oscillator frequency may be changed slightly.

Also when operating in the slow sweep position a pulse K is supplied from a mixer 51 to the deflecting electrode 14 by way of a lead 52, a switch contact point 53 and a switch arm 54.

When operating in the fast sweep position, a circle lighting pulse L is supplied from a multivibrator 46 to the control grid 13 of the cathode ray tube. It is supplied by way of a lead 47, a switch contact point 48 and the switch arm 43.

The pulses L for circle lighting are produced as follows, referring to Figs. 1 and 2:

The wave N' is passed through a differentiating and clipping circuit 56 to obtain the positive pulses H. The pulses H drive a delay multivibrator 57 to produce the pulses I, the back edges of which may be varied in time. The timing adjustment of the back edges of the pulses I preferably is made in 1000 microsecond steps by means of a delay control knob 53 which may control the positive bias on the grid of a tube, for example. Delay multivibrators are well known in the art and need not be described in detail here. The feature of making the delay adjustments in steps or jumps of 1000 microseconds will be discussed hereinafter.

The wave I is passed through a differentiating and clipping circuit 59 to obtain the positive pulses J which occur at the variable back edges of the pulses I. Thus the pulses J are variable in time.

The pulses J are supplied to the mixer 51 where they are combined with the pulses G to obtain the wave K. The pulses G are obtained by passing the wave N through a differentiating and clipping circuit 61. The wave K drives the multivibrator 46, thus producing the circle lighting pulses L. As indicated in Fig. 2, the first pulse L, which is under pulse A, is fixed in timing while the next pulse L is adjustable in timing since it starts in response to the occurrence of the variable back edge of the pulse I. The cathode ray of the tube 10 is, of course, normally biased off or blocked and strikes the screen only during the occurrence of a positive pulse L. The pulses L have a width at least great enough to light a full fast sweep of 1000 microseconds' duration and preferably have a somewhat greater width such as a width equal to one and one quarter rotations of the fast sweep.

It will be seen that by adjusting the delay control knob 58 of the multivibrator 57 the adjustable circle lighting pulse L can be set under the pulse B so that it will be visible on the timing sweep.

While the delay multivibrator 57 may be continuously adjustable it preferably is adjustable in jumps of 1000 microseconds each, as previously mentioned, and the knob 58 is provided with detents. Also the knob 58 has a dial 69 marked in 1000 mocrosecond units. To insure accurate jumps of 1000 microseconds there preferably is a connection 62 from the 1000 cycle oscillator 18 to the delay multivibrator 57 for obtaining a more precise lock-in. Such an arrangement is well known in the art and need not be described in detail. However, it may be mentioned that in order to obtain sharp pulses from some point in oscillator 18 the oscillator tube may be operated class C and pulses taken off a small resistor through which the brief plate current pulses flow.

The sequence of the operations for obtaining a time measurement from a pair of ground stations may now be summarized as follows:

The station selector knob 63 (Fig. 1) is turned to the proper position for receiving from the desired pair of ground stations. The drift knob 44 is then adjusted to drift the A and B pulses so that both A and B pulses are visible on the tube 10 with one pulse at the zero position as shown in Fig. 3. It is then known that the pulse at zero position is the A pulse.

The time interval may now be read in 1000 microsecond units from the 1000 microsecond markings on the face of the cathode ray tube 10, if desired. In the example illustrated this reading is 1000 microsecond. Or this first reading may be read off the dial 60 after making the adjustment described below.

The K pulse also appears on the tube screen. It can readily be distinguished from the A and B pulses because it is a sharper pulse and also because adjusting the knob 58 of the delay multivibrator 57 changes its position. Before switching to the fast sweep position the knob 58 is set to the position that puts the K pulse closest to the B pulse but preceding it as shown in Fig. 3. Now the reading in 1000 microsecond units may be taken off the dial 60.

The foregoing positioning of the K pulse has moved the circle lighting pulse L under the pulse B as will be evident from an inspection of Fig. 2.

The switches 24, 26 and 43, 54 are now moved to the fast sweep position. This expands each 1000 microsecond interval to full scale as shown in Fig. 4. The pulse B is visible since the cathode ray is unblocked by the pulse L.

The final step is to adjust the phase shifter 33 until pulses A and B are coincident as shown in Fig. 5. In making this adjustment the phase shifter rotor is turned in the direction to move the pulse B counter-clockwise. The amount of phase displacement required to obtain pulse coincidence is an exact measure of the time displacement of the A and B pulses and is given in units of 100 microseconds, 10 microseconds and 1 microsecond. Assume this reading from the phase shifter dial 35 is 655 microseconds. Then the total reading in the example assumed is 1655 microseconds. It will be understood that the initial phase shifter adjustment is such that it reads zero with no time displacement between the A and B pulses.

Referring now to the matter of station selection, in loran systems the different pairs of stations operate on the same carrier frequency but each pair of stations transmits pulses at a slightly different repetition rate. Thus the receiving apparatus may be adjusted by a station selector knob 63 so that only the pulses from one pair of stations will remain stationary on the timing sweeps.

The station selector knob 63 functions to change the frequency of the oscillator 18 slightly in steps determined by the position of a switch arm 64. The switch 64 may switch small capacitors in or out of the oscillator circuit for example.

Instead of employing a single oscillator circuit operating at the 100 cycle frequency, it may be preferable to employ an oscillator such as shown in Fig. 6 where the beat frequency difference between two oscillators is employed.

Referring to Fig. 6 two oscillators 71 and 72 which are controlled by piezo electric crystals 73 and 74 operate at frequencies 1 kc. or approximately 1 kc. apart. The oscillator outputs are supplied to a mixer 76 where they beat to produce the difference frequency. The mixer output circuit includes a circuit 77 that is tuned to the difference frequency whereby the difference frequency signal is the only one applied to the frequency divider 19 and to the phase shifter 33 (Fig. 1).

The beat frequency is changed the desired amount for station selection by switching different amounts of capacity in shunt with the crystals 73 and 74. The capacitors C1, C2, etc. may be selectively connected across the crystal 73 by means of a switch 78. The capacitors C'1, C'2, etc. may be selectively connected across the crystal 74 by means of a switch 79. The switches 78 and 79 are ganged so as to be operated by a single station selector knob 81.

As indicated by the legends on the drawing, as the switches 78 and 79 are turned to the right the capacitors C1, C2, etc. are of increasing capacity so as to "drag" down the frequency of oscillator 71 increasing amounts. At the same time the frequency of oscillator 72 goes up increasing amounts because the capacitors C'1, C'2, etc. are of decreasing capacity. Thus, the beat frequency is increased slightly each time the switches 78 and 79 are moved one step to the right. It will be understood that this change in beat frequency is only a few cycles, that being sufficient for station selection in loran systems. The desired frequency change is readily effected by selecting shunting capacitors of the proper value.

While it has been assumed in the foregoing description of the invention that the time interval readings are in microseconds, this is strictly true for only one setting of the station selector switch. At other station settings a correction factor near unity must be applied to the time interval readings if exact readings in microseconds are desired, this correction being required because of the change in the oscillator frequency.

There is no necessity for employing such correction factors unless the receiver is being used with loran system maps that have the hyperbolic lines marked in microseconds for use with loran receivers of the type that give all readings exactly in microseconds. Maps prepared especially for use with the receiver of the present invention would have the hyperbolic lines marked in figures that are not exactly in microseconds and that correspond to the readings of the receiver without any correction factors applied.

It may be noted that while the blanking wave M preferably is applied to the cathode ray tube for obtaining alternate blanking of the sweep, the wave M may be applied instead to the receiver 17 to block it for periods corresponding to the sweep blanking periods that have been described. While certain of the following claims refer to blocking the cathode ray of the indicator tube, it is to be understood that such claims cover the equivalent arrangement of blocking the receiver instead.

I claim as my invention:

1. In a navigation system wherein periodically recurring radio pulses are radiated from A and B ground stations as A and B pulses, respectively, having like repetition periods with the B pulses occurring at a time not earlier than the mid-point of the period of the A pulses, a receiving system for measuring the time interval between the A and B pulses as they appear at a point remote from said ground stations which comprises means for receiving said A and B pulses at said point, a cathode ray tube indicator including a screen and means for producing a cathode ray and directing it toward said screen, means for deflecting said cathode ray at a repetition rate equal to four times the repetition rate of said A pulses, means for applying the A and B pulses from said receiver to the cathode ray tube to cause said pulses to act on the cathode ray and thereby produce indications on said screen, means for blocking said cathode ray during alternate deflections of said cathode ray whereby said alternate deflections are blanked out so that the A pulse indication is blanked out if the B pulse is phased to appear at the start of a cathode ray deflection.

2. The invention according to claim 1 wherein additional means is provided to produce a multiple frequency deflecting wave having a repetition rate that is a multiple of said first deflecting rate and wherein either said multiple frequency wave or said first deflecting wave may be selectively applied to said deflecting means and wherein said multiple frequency wave is applied alternately through two channels, each of said channels including a gating device and one of said channels including a calibrated phase shifter, and wherein there is means for making said gating devices operative alternately to pass said comparatively high frequency wave.

3. In a navigation system wherein periodically recurring radio pulses are radiated from A and B ground stations as A and B pulses, respectively, having like repetition periods with the B pulses occurring at a time not earlier than the mid-point of the period of the A pulses, a receiving system for measuring the time interval between the A and B pulses as they appear at a point remote from said ground stations which comprises means for receiving said A and B pulses at said point, a cathode ray tube indicator including a screen and means for producing a cathode ray and directing it toward said screen, means for deflecting said cathode ray at a repetition rate equal to four times the repetition rate of said A pulses, means for applying the A and B pulses from said receiver to the cathode ray tube to cause said pulses to act on the cathode ray and thereby produce indications on said screen, means for producing a rectangular blanking wave having a repetition rate equal to one-half that of the cathode ray deflection whereby it has a blanking half cycle of a duration equal to one deflection period, means for utilizing said blanking half cycles of said rectangular wave to prevent either A or B pulses from appearing on said cathode ray tube screen during the occurrence of said blanking half cycles whereby the A pulse indication is blanked out if the B pulse is phased to appear at the start of a cathode ray deflection.

4. The invention according to claim 3 wherein additional means is provided to produce a deflecting wave having a repetition rate that is a multiple of said first deflecting rate and wherein either said multiple frequency wave or said first deflecting wave may be selectively applied to said deflecting means and wherein said multiple frequency wave is applied alternately through two channels, each of said channels including a gating device and one of said channels including a calibrated phase shifter, and wherein there is means for making said gating devices operative alternately to pass said comparatively high frequency wave.

5. In a navigation system wherein periodically recurring radio pulses are radiated from A and B ground stations as A and B pulses, respectively, with the B pulses occurring at a predetermined time following the mid-point of the period of the A pulses, a receiving system for measuring the time interval between the A and B pulses as they appear at a point remote from said ground stations which comprises means for receiving said A and B pulses at said point, a cathode ray tube indicator including a screen and means for producing a cathode ray and directing it toward said screen, means for deflecting said cathode ray at a repetition rate equal to four times the repetition rate of said A pulses, means for applying the A and B pulses from said receiver to the cathode ray tube to cause said pulses to act on the cathode ray and thereby produce indications on said screen, means for producing a rectangular blanking wave having a repetition rate equal to one-half that of said cathode ray deflection rate, means for blocking said cathode ray by alternate half cycles of said rectangular wave whereby alternate deflections of said cathode ray are blanked out so that the A pulse indication is blanked out if the B pulse is phased to appear at the start of a cathode ray deflection.

6. In a navigation system wherein periodically recurring radio pulses are radiated from A and B ground stations as A and B pulses, respectively, having like repetition periods with the B pulses occurring at a time not earlier than the mid-point of the period of the A pulses, said A pulses having a repetition period of approximately 40,000 microseconds, a receiving system for measuring the time interval between the A and B pulses as they appear at a point remote from said ground stations which comprises means for receiving said A and B pulses at said point, a cathode ray tube indicator including a screen and means for producing a cathode ray and directing it toward said screen, means for deflecting said cathode ray ate a repetition rate equal to four times the repetition rate of said A pulses whereby the period of one deflection is approximately 10,000 microseconds, means for applying the A and B pulses from said receiver to the cathode ray tube to cause said pulses to act on the cathode ray and thereby produce indications on said screen, means for producing a rectangular blanking wave having a repetition rate equal to one-half that of the cathode ray deflection whereby it has a blanking half cycle of approximately 10,000 microseconds duration, means for blocking said cathode ray by said blanking half cycles of said rectangular wave whereby alternate deflections of said cathode ray are blanked out so that the A pulse indication is blanked out if the B pulse is phased to appear at the start of a cathode ray deflection.

7. The invention according to claim 6 wherein additional means is provided to produce a deflecting wave having a repetition rate that is ten times that of said first deflecting rate and wherein either said multiple frequency wave or said first deflecting wave may be selectively applied to said deflecting means and wherein said multiple frequency wave is applied alternately through two channels, each of said channels including a gating device and one of said channels including a calibrated phase shifter, and wherein there is means for making said gating devices operative alternately to pass said comparatively high frequency wave.

8. The invention according to claim 7 wherein additional means is provided to produce an indicating pulse that is adjustable in steps of 1000 microseconds and which occurs during an unblanking half cycle of said blanking wave, and wherein there is means for applying said indicating pulse to the cathode ray tube during a deflection produced by the lower frequency deflecting wave to cause said indicating pulse to act on the cathode ray of said tube and thereby produce an indication on said screen.

9. In a system for measuring the time interval between successive electrical pulses, an oscillator operating at a comparatively high frequency, means for producing a wave having a frequency that is a subharmonic of said frequency, a cathode ray indicator tube having deflecting means and a control electrode, deflection circuit means for applying to said deflecting means a deflecting wave recurring at said comparatively high frequency, deflecting circuit means for applying to said deflecting means a deflecting wave recurring at said subharmonic frequency, switching means for selectively applying to said deflecting means one of said deflecting waves, and means for blocking the cathode ray of said tube during alternate cycles of said subharmonic frequency wave while said switching means is in position for applying said subharmonic frequency wave to the deflecting means.

10. The invention according to claim 9 wherein said wave of comparatively high frequency is applied to said deflecting means alternately through two channels, each of said channels including a gating device and one of said channels including a calibrated phase shifter, and means for making said gating devices operative alternately to pass said comparatively high frequency wave.

11. In a system for measuring the time interval between successive electrical pulses where the time interval is at least 20,000 microseconds and does not exceed 30,000 microseconds, an oscillator operating at a frequency that is approximately 1000 cycles per second, means for producing a wave having a frequency that is a subharmonic of said frequency and which is approximately 100 cycles per second, a cathode ray indicator tube having deflecting means and a control electrode, deflection circuit means for applying to said deflecting means a deflecting wave recurring at said first frequency, deflecting circuit means for applying to said deflecting means a deflecting wave recurring at said subharmonic frequency, switching means for selectively applying to said deflecting means one of said deflecting waves, and means for blocking the cathode ray of said tube during alternate cycles of said subharmonic frequency wave while said switching means is in position for applying said subharmonic frequency wave to the deflecting means.

12. The invention according to claim 11 wherein said wave of comparatively high frequency is applied to said deflecting means alternately through two channels, each of said channels including a gating device and one of said channels including a calibrated phase shifter, and means for making said gating devices operative alternately for periods of approximately 10,000 microseconds each to pass said comparatively high frequency wave.

References Cited in the file of this patent

UNITED STATES PATENTS

| | | |
|---|---|---|
| 2,403,600 | Holmes et al. | July 9, 1946 |
| 2,403,626 | Wolff et al. | July 9, 1946 |
| 2,430,570 | Hulst | Nov. 11, 1947 |
| 2,442,692 | Holst et al. | June 1, 1948 |

OTHER REFERENCES

"Loran Indicator"—Electronic Industries, March 1946, pages 84–93, 126, 128, 130, 132. Copy in Div. 51.